United States Patent
Foner et al.

(10) Patent No.: US 6,529,893 B1
(45) Date of Patent: Mar. 4, 2003

(54) EXPERT DIAGNOSTIC SYSTEM WITH INFERENCE GENERATOR

(76) Inventors: Mandel Foner, 31150 N. Park Dr., Farmington Hills, MI (US) 48331-1450; Donald Earl Geister, 3232 Bluett Rd., Ann Arbor, MI (US) 48105

( * ) Notice: Subject to any disclaimer, the term of this patent is extended or adjusted under 35 U.S.C. 154(b) by 0 days.

(21) Appl. No.: 09/259,093

(22) Filed: Feb. 26, 1999

(51) Int. Cl.[7] .................................................. G06N 5/02
(52) U.S. Cl. ........................................... 706/60; 706/52
(58) Field of Search ........................... 701/99; 702/185, 702/184; 706/52, 60; 714/737; 376/216; 379/10; 382/145

(56) References Cited

U.S. PATENT DOCUMENTS

| | | | |
|---|---|---|---|
| 4,697,243 A | | 9/1987 | Moore et al. |
| 4,803,040 A | * | 2/1989 | Gross ........................... 376/216 |
| 4,967,368 A | * | 10/1990 | Bolling et al. ................. 706/52 |
| 4,972,453 A | * | 11/1990 | Daniel, III et al. ............ 379/10 |
| 5,001,714 A | * | 3/1991 | Stark et al. ................... 714/737 |
| 5,208,745 A | | 5/1993 | Quentin et al. |
| 5,265,035 A | * | 11/1993 | Reifman et al. ............. 702/185 |
| 5,293,556 A | * | 3/1994 | Hill et al. .................... 702/184 |
| 5,351,247 A | | 9/1994 | Dow et al. |
| 5,442,555 A | * | 8/1995 | Reifman et al. ............... 701/99 |
| 5,469,463 A | | 11/1995 | Polich et al. |
| 5,517,405 A | | 5/1996 | McAndrew et al. |
| 5,687,212 A | * | 11/1997 | Kinser, Jr. et al. ............ 379/10 |
| 6,091,846 A | * | 7/2000 | Lin et al. ..................... 382/145 |

OTHER PUBLICATIONS

Vasandani, V.; Govindaraj, T., Knowledge organization in intelligent tutoring systems for diagnostic problem solving in complex dynamic domains, Systems, Man and Cybernetics, IEEE Transactions on, vol.: 25 7, Jul. 1995, pp.: 1076–1096.*

Kyungseob Yoon; Changjong Wang, Authoring system for the development of ITS, TENCON '94. IEEE Region 10's Ninth Annual International Conference. Theme: Frontiers of Computer Technology. Proceedings of 1994, Aug. 22–26, 1994, pp.: 97–101 vol. 1.*

Warren, J.R.; Warren, D.E.; Freedman, R.W., Interviewing expertise in primary care medicine: a knowledge–based support system, System Sciences, 1994. vol. III: Information Systems: Decision Support and Knowledge–Based Systems, Proceedings of the Twenty–Se, Jan. 1994.*

Uthurusamy, R.; Means, L.G.; Godden, K.S.; Lytinen, S.L., Extracting knowledge from diagnostic databases, IEEE Expert [see also IEEE Intelligent Systems] vol. 8 6, Dec. 1993, pp.: 27–38.*

Bonfa, I.; Maioli, C.; Sarti, F.; Milandri, G.L.; Dal Monte, P.R., HERMES: an expert system for the prognosis of hepatic diseases, Artificial Neural Networks and Expert Systems, 1993. Proceedings., First New Zealand International Two–Stream Conference on, Nov. 1993.*

(List continued on next page.)

Primary Examiner—Wilbert L. Starks, Jr.
(74) Attorney, Agent, or Firm—Harness, Dickey & Pierce, PLC

(57) ABSTRACT

A method and expert system are capable of assisting experts in documenting failure attributes of a functional system as well as subsequent users in diagnosing the functional system. The system uses an author interface, an inference generator, and a user interface to draw authoring and diagnostic inferences based on expert and user input. The inference generator includes a knowledge base containing general failure attribute information. The inference generator allows the expert system to provide experts and users with suggestions relating to the particular task at hand. The result is a fully integrated means for documenting failure attributes of a functional system, and for diagnosing the functional system.

23 Claims, 2 Drawing Sheets

OTHER PUBLICATIONS

Vasandani, V.; Govindaraj, T.; Mitchell, C.M., An intelligent tutor for diagnostic problem solving in complex dynamic systems, Systems, Man and Cybernetics, 1989. Conference Proceedings., IEEE International Conference on , Nov. 14–17, 1989, pp.: 772 v.*

Ng, C.K.; Chow, K.P., An expert system for diagnosis of electronic equipment using structural model and trouble–shooting heuristics, TENCON '89. Fourth IEEE Region 10 International Conference, Nov. 22–24, 1989, pp.: 669–673.*

Vasandani, V.; Govindaraj, T., Knowledge representation and human–computer interaction in an intelligent tutor for diagnostic problem solving, Systems, Man and Cybernetics, 1990. Conference Proceedings., IEEE International Conference on, Nov. 4–7, 1990, Pa.*

Norbert Fuhr; Integration of probabilistic fact and text retrieval; Proceedings of the Fifteenth Annual International ACM SIGIR conference on Research and development in information retrieval, Jun. 21–24, 1992, pp. 211–222.*

* cited by examiner

EXPERT DIAGNOSTIC SYSTEM WITH INFERENCE GENERATOR

BACKGROUND AND SUMMARY OF THE INVENTION

The present invention relates generally to expert diagnostic systems. More particularly, the invention relates to an expert system capable of assisting experts in documenting failure attributes of a functional system as well as subsequent users in diagnosing the functional system.

Recent inroads into the area of artificial intelligence and expert systems have uncovered many applications in which computers can make decisions traditionally left to humans. Such applications include managing the healthcare of individual patients, troubleshooting elevator systems, and identifying likely failure points in digital data processing systems.

In general, active components and passive components can be coupled together to create various functional systems such as mechanical systems, electrical systems, and biological systems. Each of these functional systems has failure attributes associated with the system's components and couplings. Failure attributes typically comprise the failure modes of the components and couplings, as well as the failure symptoms associated with each failure mode.

For example, a conveyor system with a drive motor bolted to a foundation block is a common functional system. The drive motor could have the failure modes of a bent shaft, a warped rotor, a cracked magnet, etc. The bent shaft and the warped rotor failure modes may exhibit the same failure symptom of fluctuating belt velocity, while the cracked magnet failure mode may have a failure symptom of low torque. Typically, when a mechanic or user observes the failure symptom of fluctuating belt velocity, it would be helpful to know that this symptom means the drive motor either has a bent shaft or a warped rotor. However, the coupling between the drive motor and the foundation block also has a set of failure modes which could lead to the very same failure symptom. The user would therefore need to know to check the coupling between the drive motor and the foundation block as well as the drive motor. Considering the high number of components and couplings in a typical functional system, and the difficulty in identifying every possible component and coupling failure, it is clear that troubleshooting can become too difficult for a relatively inexperienced user.

Users must therefore often rely heavily on documentation provided by either the designer of a functional system, or an expert in the relevant field such as a product engineer. This reliance frequently leads to difficulties due to oversight on behalf of the expert in documenting the failure attributes and troubleshooting techniques, as well as subsequent changes in knowledge of the functional system as a result of the "learning process."

Expert systems draw from the concept that an expert in any given field has a unique methodical approach to solving a particular problem in the relevant field. The value of the expert system is found in the fact that different experts may have different approaches to solving the same problem. As such, the expert system looks to combine the various methodical approaches of experts in the given field to create a comprehensive knowledge base to draw from when similar problems arise in the future. Expert systems are therefore useful to experts in a given field as a consultation "second opinion" and to non-experts as a decision making tool.

A typical knowledge base may include rule-based information relating to a given set of input parameters. Generally, the knowledge base is authored by a knowledge engineer with one or more experts in the given field providing the input parameters and raw decisional rules. Once the knowledge base has been authored, users of varying expertise may use the expert system to make decisions or solve problems. Several difficulties arise, however, with such an expert system. As noted above, one problem is the fact that any expert system is only as dependable as the expert or experts providing the information contained in the knowledge base. This "human factor" often causes either unrecognized decision making processes, or merely forgotten information.

While certain technology-specific expert systems have been used for diagnostic purposes, the concept of a fully trainable documentation system in conjunction with a fully trainable diagnostic system is new to the art. In other words, current techniques fail to address the fact that the process of creating a knowledge base lends itself to artificial intelligence just as much as the subsequent diagnostic process. Therefore, while traditional expert systems treat diagnosis of a functional system as a one-dimensional specialized activity, the reality is that effective diagnosis begins at the authoring stage.

For a more complete understanding of the invention, its objects and advantages, reference may be had to the following specification and to the accompanying drawings.

DETAILED DESCRIPTION OF THE PREFERRED EMBODIMENT

Figure 1:
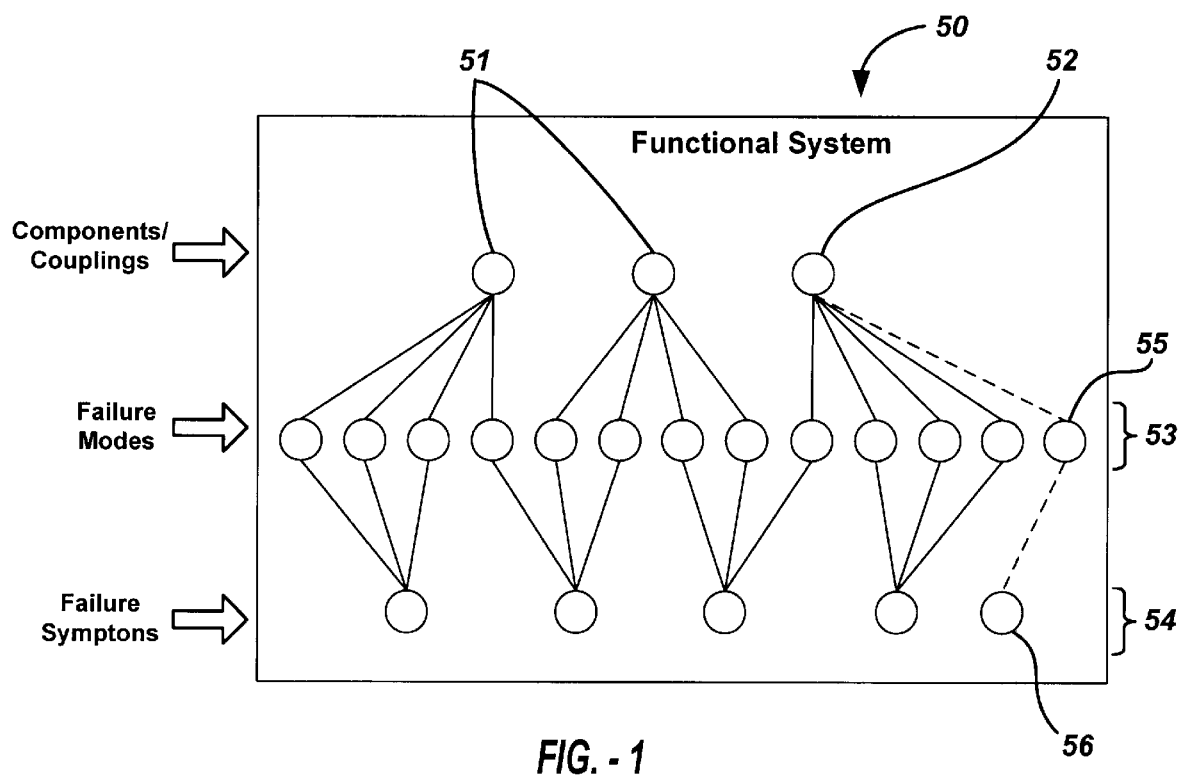
FIG. 1 is a diagram of a typical functional system.
Figure 2:
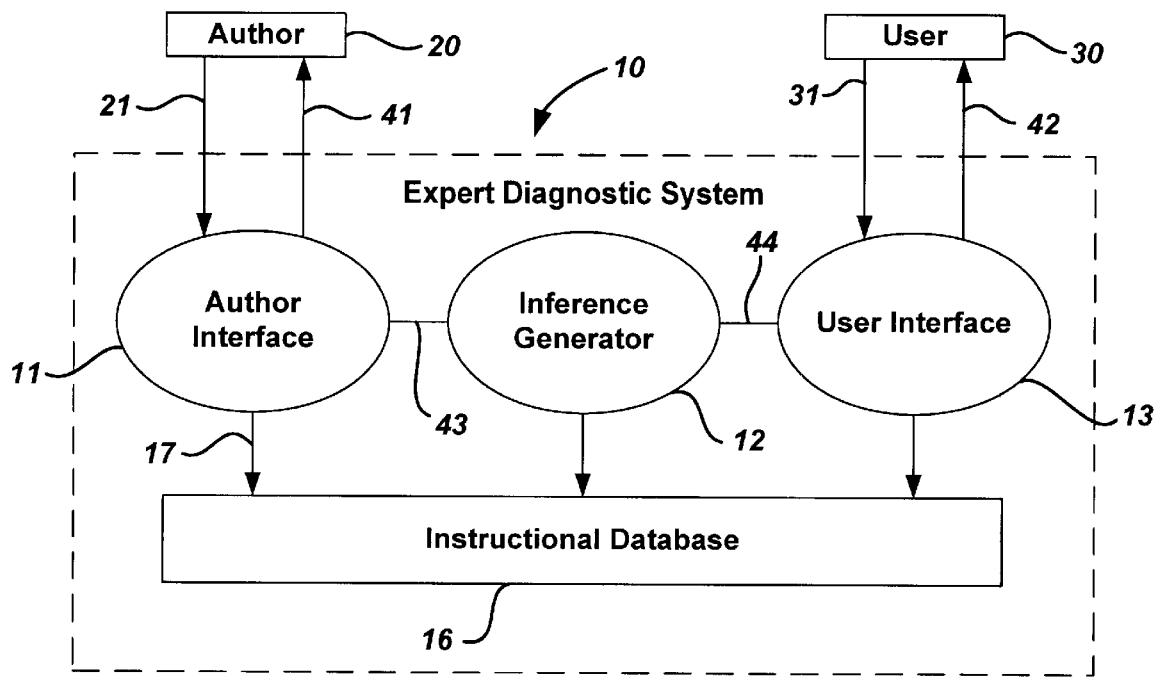
FIG. 2 is a dataflow diagram illustrating one embodiment of the present invention.

Referring to FIGS. 1 and 2, an exemplary expert diagnostic system is illustrated at 10. An author interface 11, an inference generator 12, and a user interface 13, allow the expert diagnostic system 10 to document failure attributes of a functional system 50 as well as diagnose the functional system 50. Generally, when the author 20 documents the failure attributes of the functional system 50, the inference generator 12 uses the expert input 21 to create inference input in the form of authoring inferences 43 which aid in the authoring of documentation for the functional system 50. Furthermore, once the failure attributes of the expert system 10 have been initially documented by the author, the inference generator 12 can assist a subsequent user 30 in diagnosing the functional system 50 based on user input 31. Expert input comprises various types of information relating to the functional system 50 such as components 51, component couplings 52, failure modes 53, and failure symptoms 54. User input 31 preferably comprises various types of information relating to the functional system 50 such as failure symptoms 54 and diagnosis results. The result is a fully integrated means for documenting failure attributes of a functional system 50, and for diagnosing the functional system 50.

Specifically, the author interface 11 receives expert input 21 from an author 20 and creates instructional data 17 relating to the failure attributes of the functional system 50. The user interface 13 receives user input 31 from a user 30, and presents the instructional data 17 to the user 30 in the form of troubleshooting or calibration procedures. Preferably, the instructional data 17 is stored in an instructional database 16 which is accessible by all system components. The inference generator 12 creates inference input from the expert input 21 and the user input 31, such that the expert system 10 is also able to create instructional data 17 from the inference input. The inference input preferably comprises authoring inferences 43 and diagnostic inferences 44, such that the inference generator 12 creates the authoring inferences 43 from the expert input 21, and the diagnostic inferences 44 from the user input 31.

Figure 3:
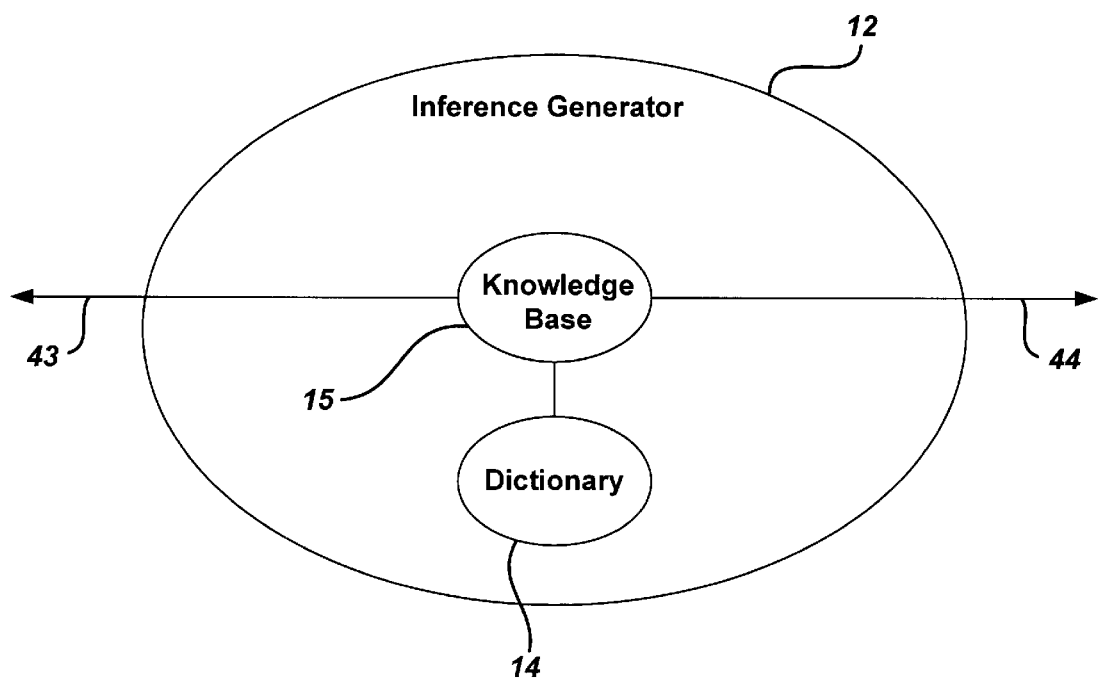
FIG. 3 is a detailed illustration of an inference generator for the preferred embodiment.

Turning now, to FIGS. 3 and 4, the inference generator 12 also preferably comprises an updateable knowledge base 15 wherein the knowledge base 15 contains diagnostic rules for creating the inference input. The inference generator 12 further includes a component dictionary 14 containing failure attributes relating to functional systems in general. The expert input 21 and the user input 31 serve as the basis for retrieving failure attribute information from the component dictionary 14. For example, the preferred component dictionary 14 can include general information about electrical, mechanical, chemical and biological components and couplings, and any failure attribute information that may be available. When an author 20 or user 30 provides input regarding a particular component, the knowledge base 15 retrieves failure attribute information regarding the component and submits the information to the author interface 11 and user interface 13 as inference input. The component dictionary 14 is also updateable based on expert and user inputs 21 and 31.

The author interface 11 also generates authoring queries 41 based on the inference input. The authoring queries 41 can suggest additional failure modes and symptoms 55 that are relevant but may have gone unnoticed by the author 20. The inference generator 12 supplements this information with rules contained in the knowledge base 15 and general failure attribute information contained in the dictionary 14. Similarly, the user interface 13 generates diagnostic queries 42 based on the inference input. The diagnostic queries 42 prompt for additional failure symptoms 56 not included in the initial expert input 21.

While the invention has been described in its presently preferred embodiments, it will be understood that the invention is capable of certain modification and change without departing from the spirit of the invention as set forth in the appended claims.

What is claimed is:

1. A computer-implemented method for documenting failure attributes of a functional system and diagnosing said functional system, comprising steps of:
   receiving expert input from an author, the expert input defining failure attributes of the functional system;
   receiving user input from a user, the user input defining failure symptoms of the functional system;
   creating inference input from said expert input and said user input; and
   suggesting additional failure attributes to the author based on the inference input.

2. The method of claim 1 further comprising the step of generating queries based on said inference input.

3. The method of claim 2 further including the step of generating authoring queries.

4. The method of claim 2 further including the step of generating diagnostic queries.

5. The method of claim 1 further comprising the step of creating instructional data from said expert input.

6. The method of claim 1 further comprising the step of creating instructional data from said inference input.

7. The method of claim 1 further comprising the step of creating instructional data from said user input.

8. The method of claim 7 further comprising the step of presenting said instructional data to said user.

9. The method of claim 1 further including the step of selecting the functional system from a group consisting essentially of:
   electrical systems;
   mechanical systems; and
   biological systems.

10. A computer-implemented expert system for documenting failure attributes of a functional system and diagnosing said functional system, comprising:
    an author interface for receiving expert input from an author and creating instructional data relating to said failure attributes;
    a user interface for receiving user input from a user and presenting said instructional data to said user; and
    an inference generator for creating inference input from said expert input and said user input, said expert system creating said instructional data from said inference input;
    said author interface suggesting failure attributes to the author based on the inference input.

11. The expert system of claim 10, wherein said inference input comprises authoring inferences and diagnostic inferences such that said inference generator creates said authoring inferences from said expert input and said inference generator creates said diagnostic inferences from said user input.

12. The expert system of claim 10, wherein said inference generator comprises an updateable knowledge base, said updateable knowledge base containing diagnostic rules for creating said inference input.

13. The expert system of claim 12, wherein said updateable knowledge base further comprises a component dictionary for retrieving said failure attributes of said functional system.

14. The expert system of claim 10 wherein said author interface and user interface generate queries based on said inference input.

15. The expert system of claim 10 wherein said expert input comprises component information of said functional system.

16. The expert system of claim 10 wherein said expert input comprises component coupling information of said functional system.

17. The expert system of claim 10 wherein said expert input comprises failure mode information of said functional system.

18. The expert system of claim 10 wherein said expert input comprises failure symptom information of said functional system.

19. The expert system of claim 10 wherein said user interface creates instructional data from said user input.

20. The expert system of claim 10 wherein said user input comprises component failure symptom information of said functional system.

21. The expert system of claim 10 wherein said user input comprises diagnosis results.

22. The expert system of claim 10 further comprising an instructional database for storing said instructional data.

23. The expert system of claim 10 wherein the functional system is selected from a group consisting essentially of:
    electrical systems;
    mechanical systems; and
    biological systems.

* * * * *